United States Patent [19]
Harrison, Jr.

[11] Patent Number: 5,567,323
[45] Date of Patent: Oct. 22, 1996

[54] INTAKE FILTER FOR A PAINT SPRAYER

[75] Inventor: William E. Harrison, Jr., Norman, Okla.

[73] Assignee: Harrison-Pipkin, L.L.C., Oklahoma City, Okla.

[21] Appl. No.: 418,039

[22] Filed: Apr. 6, 1995

[51] Int. Cl.[6] ................................................. B01D 27/06
[52] U.S. Cl. ..................... 210/251; 210/460; 210/493.5; 210/499; 210/DIG. 17
[58] Field of Search ................................. 210/416.1, 448, 210/459, 460, 493.1, 493.2, 493.5, 499, DIG. 17, 251

[56] References Cited

U.S. PATENT DOCUMENTS 4,488,966  12/1984  Schaeffer .
4,555,337  11/1985  Gargas .
4,693,423   9/1987  Roe et al. .
4,878,930  11/1989  Manniso et al. .
5,078,762   1/1992  Hung .
5,203,998   4/1993  Benian ................................. 210/493.5
5,217,238   6/1993  Cyphers et al. .................... 280/47.18
5,248,089   9/1993  Bekius .................................. 239/154
5,252,210  10/1993  Kessel .................................. 210/452
5,286,045   2/1994  Cyphers et al. .................... 280/47.18
5,312,028   5/1994  Hume .................................... 222/326

Primary Examiner—Robert J. Popovics
Attorney, Agent, or Firm—Dunlap & Codding, P.C.

[57] ABSTRACT

A filter having a an outer peripheral surface comprising an accordion wire mesh and an inner peripheral surface comprising a support structure, the filter permitting a liquid composition such as paint to be filtered therethrough when connected to an airless paint spraying system. Method of using a filter.

3 Claims, 4 Drawing Sheets

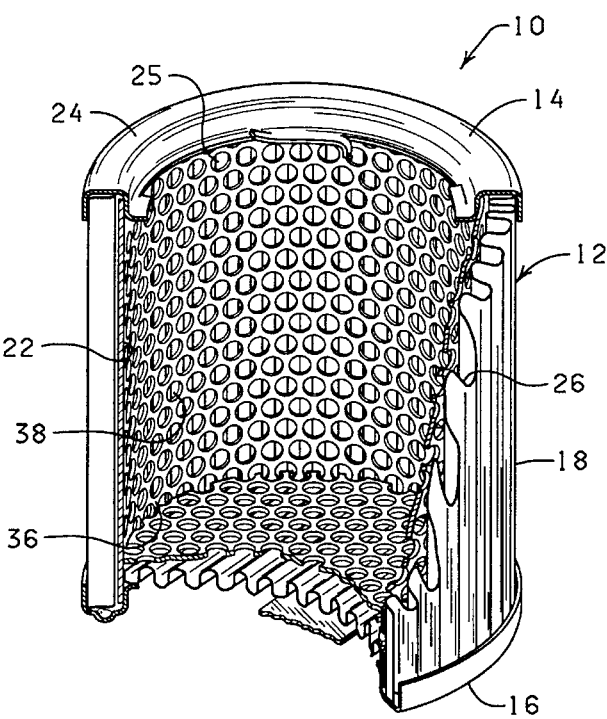
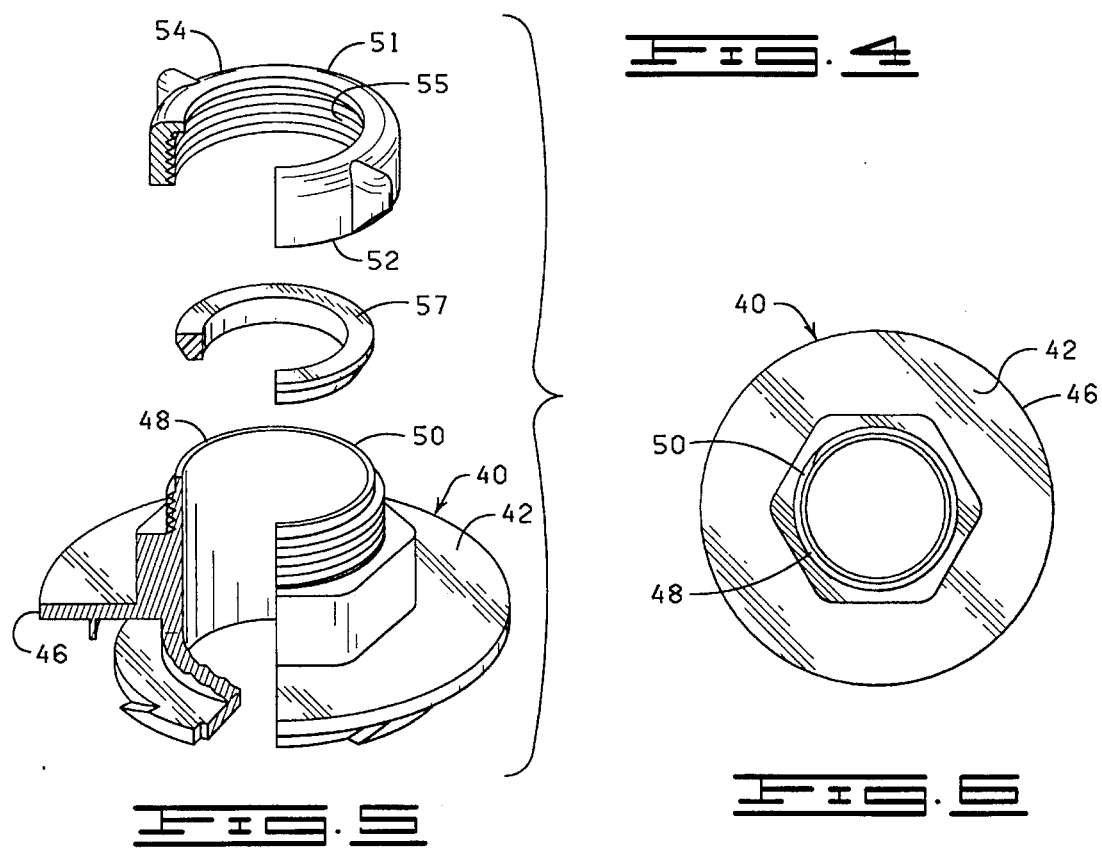

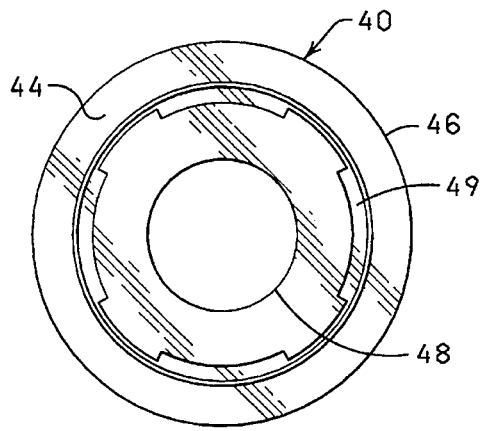
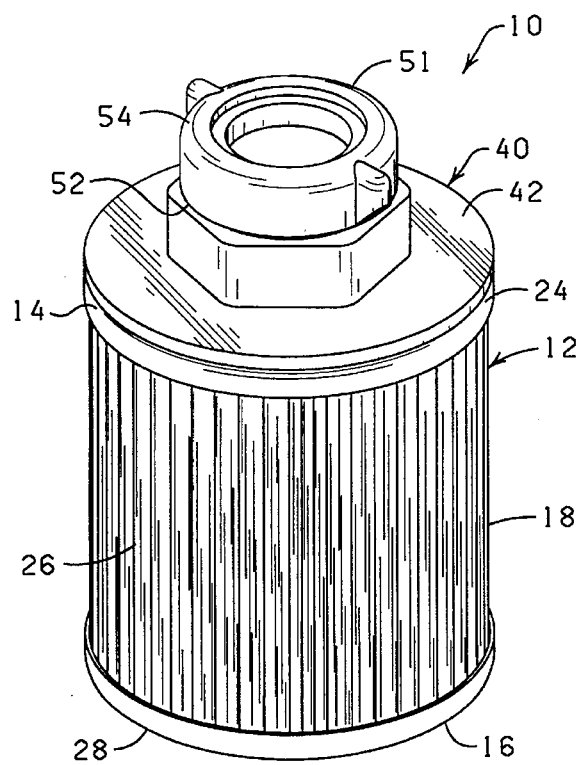
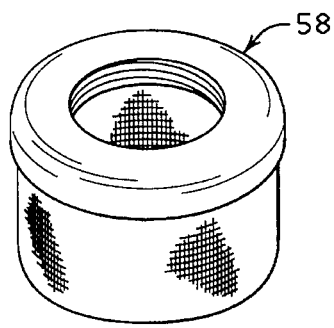
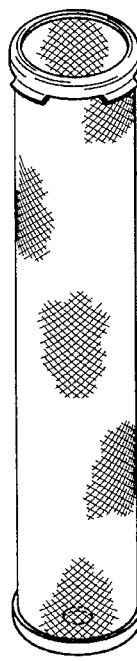
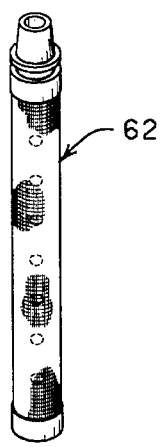
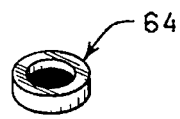

5,567,323

INTAKE FILTER FOR A PAINT SPRAYER

BACKGROUND OF THE INVENTION

1. Field of the Invention

This invention generally relates to filters for filtering liquid material or compositions adapted or capable of being filtered and then sprayed onto a surface, and, more particularly, to filters used in airless spraying systems, such as, but not by way of limitation, spraying paint, and the methods of using same.

2. Background Information

Filters have been developed for filtering various liquids and/or compositions before such liquids and/or compositions were used. Filtering was performed to remove unwanted debris and/or impurities, as well as removing solidified or semi-solid material from the liquid/composition.

In filtering paint, many filters are required between the paint as provided and the paint which is sprayed upon a final surface. When any one of these filters fail, or become clogged, painting must be stopped, and a search of the filters must be made to determine the location of the blockage in order to replace the blocked filter or filters. This work stoppage causes increased labor costs, and increased costs for parts, since the clogged filter(s) must be removed and replaced before painting can recommence.

There is a need felt within the art for a paint filter adapted to connect the receiving end of an airless paint spraying system which filters all debris, both large and small, and eliminates the need for multiple, in-line filters between the liquid paint and the final painted surface/object. Such a filter would reduce both time, labor, and the cost of replacement filter parts required for painting most surfaces.

An objective of the present invention is to provide a single filter which eliminates the need for any other in-line filters between the liquid paint and the paint sprayed upon a surface. A further goal of the present invention is to provide a filter which is quickly and easily cleaned, and is therefore re-usable. A further objective of the present invention to reduce time, labor, and the cost of replacing the many in-line filters which presently exist in an airless paint spraying system when one or more of such filters fails, and becomes clogged. It is still a further object of the present invention to provide a filter which is economical, and which also can be used with either water or oil-based compositions.

BRIEF DESCRIPTION OF THE DRAWINGS

Other objects, features and advantages of the present invention will become more fully apparent from the following detailed descriptions of the preferred embodiments, the appended claims and the accompanying drawings in which:

FIG. 4 is a transverse sectional view of the filter of FIG. 1, but showing the inner support frame as well as the outer accordion mesh;

FIG. 5 is a perspective cut-away view of the top removable 10 components of the filter, including the top, the adapter,-and the connecting element;

FIG. 6 is a top plan view of the upper surface of the top of the filter;

FIG. 7 is a bottom plan view of the lower surface of the top of the filter;

FIG. 8 is a perspective view of the filter shown in FIG. 1, but with the top connected to the upper end of the filter;

FIG. 9 is a perspective view of one of the in-line filters used in an airless paint spraying system which is replaced by the present filter, namely, a rock catcher;

FIG. 10 is a perspective view of another of the in-line filters used in an airless paint spraying system which is replaced by the present filter, namely, a cylindrical filter which is disposed in the airless paint sprayer;

FIG. 11 is a perspective view of still another of the in-line filters used in an airless paint spraying system which is replaced by the present filter, namely, a cylindrical filter which is found in the handle of the spray gun;

FIG. 12 is a perspective view of yet another of the in-line filters used in an airless paint spraying system which is replaced by the present filter, namely, a nylon disc filter which is disposed just behind the spray tip from which the paint is discharged onto a surface;

DESCRIPTION OF THE PREFERRED EMBODIMENTS

Figure 1:
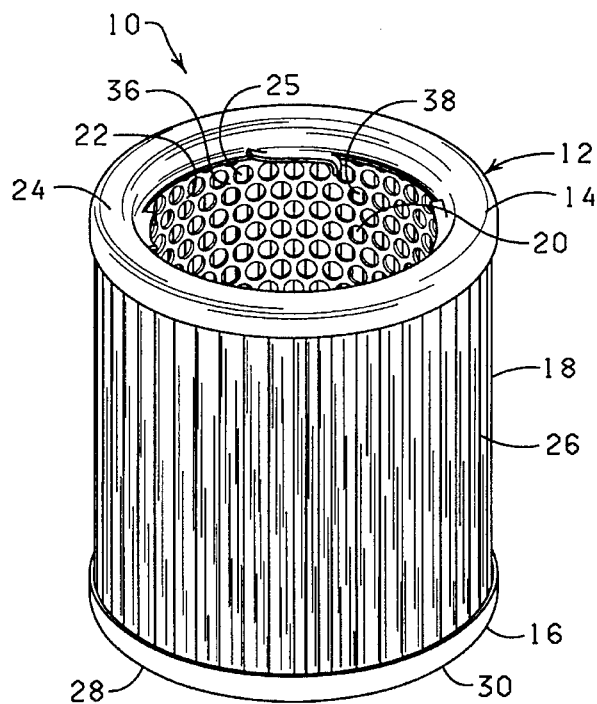
FIG. 1 is a perspective view of the top of the filter constructed in accordance with the present invention.

The Embodiments and Methods of FIGS. 1–14

Filters have been long known in the art, and are commonly used in a number of applications for filtering a variety of liquids and/or compositions. The present invention is directed to filters, particularly, a filter used in conjunction with an airless spraying system which is used to applying a paint composition to an object and/or a surface. It will be appreciated, however, that the filter of the present invention has applications which extend to the filtering of a number of different compositions, and the application of these differing liquids, compositions and/or substances, including, but not limited to water-based and/or oil-based liquids, compositions and/or substances, including, but not limited to, paints. It will be appreciated that additional applications of the filter of the present invention will suggest themselves to those having ordinary skill in the art.

Turning to the use of filters to filter paint, one problem with currently existing filters is that they frequently become clogged with debris, even though the paint is filtered multiple times in-line during the process of moving the paint from the paint container, through the airless spraying system, and onto a surface and/or object to be painted. Such clogs cause a stoppage of the painting procedure, that is, the paint will not spray out onto the surface/object to be painted. This stoppage causes the operator down-time while determining the location or locations of the clogs, and eliminating them through replacement of the clogged filter(s). Such stoppages increase both labor costs and part costs.

In order to reduce stoppages, the paint is filtered a number of times. In a current airless paint spraying system, for example, the paint (water based or oil based) is usually strained first through a large nylon mesh bag (not shown). A rounded, larger (20–50 wire mesh, i.e., a large mesh) metal filter (FIG. 9) is connected to the receiving end (i.e., the end which receives paint from a container filled with paint, not shown) of an airless paint sprayer. This filter is called a "rock catcher" in the art, because it is used to filter larger impurities and debris. A smaller nylon mesh bag is usually disposed around the outer surface of the rock catcher, to filter smaller impurities/debris (not shown).

In operation, the receiving end of the airless paint sprayer, with rock catcher and nylon bag disposed thereabout, is disposed in the paint container (not shown). The paint is moved into the airless paint sprayer via a pump contained within the airless paint sprayer (hereinafter "sprayer") which exerts from about 2,000 psi to about 5,000 psi to move the paint both into the sprayer and out of the sprayer and onto the selected surface/object. When in the sprayer, the paint is moved through a large cylindrical filter (FIG. 10) and then into a hose which is connected to a spray gun. The paint is moved through another small cylindrical filter (FIG. 11) in the handle of the spray gun. Connected to the spray gun is a spray tip, and the paint is filtered a final time through a fine nylon mesh disk (FIG. 12) before it is ejected through the spray tip and onto the desired surface/object, as will be described in further detail below. Therefore, in routine airless paint spraying, the paint is first strained, and then filtered through five filters before the paint is sprayed on the desired surface/object.

Such in-line filtering is expensive, and the need for replacement filters is costly. The nylon straining bags are too time consuming to re-clean. It is therefore cheaper to dispose of such bags after each use, and to obtain a new nylon bag for each new painting session. The rock catcher (FIG. 9) can be cleaned and re-used. The large cylindrical filter (FIG. 10) in the airless paint sprayer must be replaced (due to clogs and stoppages) every 200 to 300 gallons. The small cylindrical filter (FIG. 11) in the handle of the spray gun must be replaced after every 100 gallons, or after each time the spray gun is used (which ever comes first). The nylon mesh disk filter (FIG. 12) near the spray tip must be replaced after each use. Therefore, the cost of replacing filters, per five-day work week, on an airless spray system which is used approximately eight hours per day, is presently approximately 100 to 150 dollars per week. Of course, this cost does not include increased labor costs for down time.

The present invention contemplates a filter which eliminates the need for the plurality of in-line filters described above, and which also eliminates the need to strain, i.e., pre-filter, the paint. The present filter is effective because it utilizes a very fine wire mesh, i.e., a very narrowly woven wire mesh which is known in the art as "100 mesh", and which is readily commercially available, which is shaped into an accordion shape about the cylindrically-shaped filter. Inside of the filter is a support frame which has a plurality of larger openings. The top of the filter disconnects and reconnects, to permit cleaning of the filter for re-use. Such disconnection of the top permits the thorough cleaning of all components of the filter 10 described herein. It will be appreciated by those having ordinary skill in the art that, besides the rock catcher, none of the previously described filters permit multiple cleaning and re-use.

The present invention, due to its fine wire mesh (100 mesh wire) shaped in an "accordion" (i.e., sinusoidal) shape, along with its support structure with a plurality of openings, permits complete filtering of all debris/impurities at the receiving end, i.e., the outer peripheral surface of the filter when the paint is first drawn into the airless spray system. The filtering is complete, so that the need for all other filters in the airless spray system is unnecessary. That is, the present filter is the only one needed. The filtering with the present invention is complete, because both large and small particles are filtered and caught in the inward folds of the accordion wire mesh, yet the outer folds permit continuous filtering of the paint. In the same mode, large strips of impurities, for example, but not by way of limitation, dried paint, are caught by the outer folds of the accordion wire mesh, permitting paint to flow through the inner folds. The strong inner support structure of the filter keeps the accordion wire mesh from collapsing inward due to the pressure of the paint moving into the airless paint spraying system, thereby assisting in keeping the accordion wire mesh in its proper accordion shape. The large openings in the inner support structure permit the paint, now well-filtered, to move easily into the airless paint spraying system. The paint is easily ejected onto the desired surface/object without any additional filtering. The present invention reduces both downtime and the cost of additional parts. Labor costs are reduced, and the cost of replacing multiple filters is eliminated.

Referring now to FIGS. 1–4, designated generally by the reference numeral 10 is a filter which is constructed in accordance with the present invention. The filter 10 comprises a base 12 having an upper end 14 and a lower end 16 and an outer peripheral surface 18. An opening 20 intersecting the upper end 14 forming an inner peripheral surface 22.

The upper end 14 has an upper collar 24 formed thereabout. The upper collar 24 is formed to permit connection of the filter top (not shown) to the filter 10, and to assist in holding the outer peripheral surface 18 and the inner peripheral surface 22 of the filter 10 in place, as does the lower collar, described below. The upper collar 24 is shown having a plurality of slots 25 (only one of the plurality of slots being designated by the numeral 25) on the inner peripheral surface 22, but it will be appreciated that the upper collar 24 may utilize any means known in the art to permit easy connection, disconnection and re-connection of the filter top with the upper collar 24. The upper collar also serves to hold the upper portion of the accordion wire mesh 26 about the outer peripheral surface 18 of the base 12 of the filter 10.

The outer peripheral surface 18 of the base 12 of the filter 10 is made from a fine wire mesh (100 mesh metal wire). It will be appreciated that any metal, plastic, nylon, or combination thereof may form the fine wire mesh ("100 mesh"). Furthermore, it will also be understood that any metal, plastic, nylon, or combination thereof, may be utilized to form any component of the filter 10 described herein, so long as such component operates as described herein. The fine wire mesh is formed in an "accordion" shape, i.e., a continuous sinusoidal "in and out" shape, about the base 12 of the filter 10. The accordion wire mesh 26 permits large strips of impurities and/or debris (hereinafter termed "debris"), such as strips of dried paint, to be caught across the "outer" portion of the accordion wire mesh 26, thereby permitting the paint to continue to be filtered through other "outer" portions of the accordion wire mesh 26 as well as the "inner" portions of the accordion wire mesh 26.

In an opposing fashion, the accordion wire mesh 26 permits larger single particles or a plurality of small particles, such as, for example, but not by way of limitation, pebbles and sand, respectively, to be caught within the "inner" portions of the accordion wire mesh 26. The paint is thereby permitted to continue to be filtered through other "inner" portions of the accordion wire mesh 26 as well as through the "outer" portions of the accordion wire mesh 26.

Figure 2:
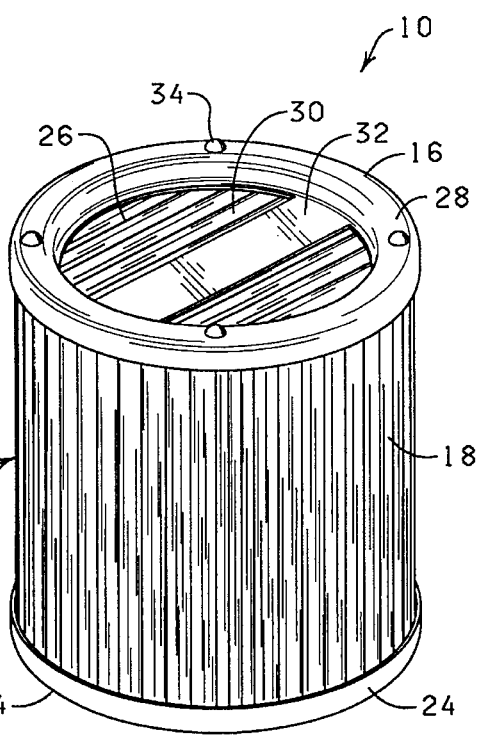
FIG. 2 is a perspective view of the filter shown in FIG. 1, but showing one embodiment of the bottom of the filter having an accordion mesh disposed thereon and a plurality of short extensions extending therefrom.

A lower collar 28 is formed about the lower end 14 of the base 12 of the filter 10. The lower collar 28 holds the lower portion of the accordion wire mesh 26 about the base 12. The lower collar 28, as shown in FIG. 2, also holds the bottom 30 of the filter 10 in place. The bottom 30 of the filter 10 may be formed from the accordion wire mesh 26 as well, with the support frame (described below). In this embodiment (FIG. 2), the accordion wire mesh may also have a support bar 32 extending thereacross, as illustrated, or may be manufactured without the support bar 32. In addition, the lower collar 28 may have a plurality of short extensions 34 (only one of the plurality of extensions designated by the numeral 34). The plurality of short extensions 34 permit the bottom 30 of the filter 10, when inserted in a container of paint, to be raised slightly above the bottom of the container, thereby permitting paint to be filtered through the bottom 30 of the filter 10 via the accordion wire mesh 26 as well as through the outer peripheral surface 18.

Figure 3:
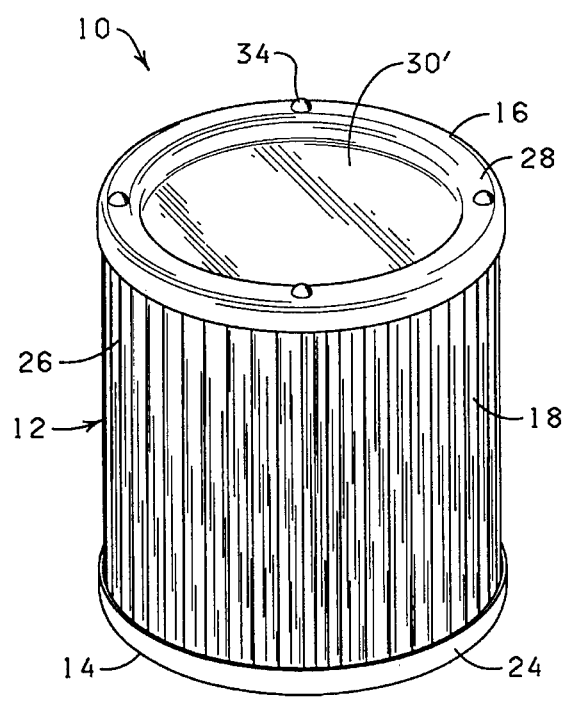
FIG. 3 is a perspective view of the filter shown in FIG. 2, but showing another embodiment of the bottom of the filter having a solid non-filtering bottom.

In an alternate embodiment for the bottom of the filter 10, as shown in FIG. 3, the filter is constructed exactly like the filter shown in FIGS. 1 and 2, and described in detail above, except that the filter has a solid bottom 30'. Further, in this alternative embodiment, the filter may have a plurality of short extensions 34, as shown, or may be manufactured without the plurality of extensions 34.

Turning now to the inner peripheral surface 22 of the filter 10 (FIG. 4), the inner peripheral surface 22 comprises a support frame 36 having a plurality of apertures 38 (only one of the plurality of apertures designated by the numeral 38). The upper portion of the support frame 36 is held in place by the upper collar 24. The lower portion of the support frame 36 is held in place by the lower collar 28. The support frame 36 with the plurality of apertures 38 forms a support for the accordion wire mesh 26, thereby preventing the accordion wire mesh 26 from collapsing inward, and providing support so that the accordion shape of the accordion wire mesh 26 is maintained against the about 2,000 to about 5,000 psi pull of the airless paint sprayer pump (not shown). The plurality of apertures 38 permit the paint which has been filtered through the accordion wire mesh 26 to flow easily into the receiving end (not shown) of the airless paint spray system. It will be appreciated, however, that an alternative support frame may be utilized, such as, but not by way of limitation, a plurality of rods, or any porous type of support frame which would support the accordion wire mesh 26 in the manner described herein.

Turning now to the FIGS. 5–8, the top 40 of the filter 10 is illustrated. The top 40 comprises an upper surface 42, a lower surface 44 and an outer periphery 46. The upper surface 42 has a top opening 48 which extends through both the upper surface 42 and the lower surface 44 of the top 40. The lower surface 44 of the top 40 has a plurality of connecting extensions 49 (only one connecting extension designated by the numeral 49) which rotatably connect the top 40 of the filter 10 to the upper end 14 of the base 12 of the filter 10. The upper collar 24 has a plurality of slots 25 which permit rotatable engagement of the plurality of connecting extensions 49, thereby connecting the top 40 to the base 12. The top 40 is removable, thereby permitting both the outer peripheral surface 18, the inner peripheral surface 22 and the bottom 30 of the filter to be easily and thoroughly flushed out and cleaned for re-use. It will be appreciated by those having ordinary skill in the art that any number of connecting means, such as, but not by way of limitation, threads, snaps, hinges, and the like, may be used to connect the top 40 to the base 12.

The top 40, as shown in FIG. 5, further comprises an upper threaded extension 50 which receives an adapter 51 having a first end 52 and a second end 54. The adapter 51 has inner threads 55 which permits the adapter 51 to connect to the upper surface 42 of the top 40, the first end 52 connecting to the top opening 48, the second end 54 connecting to the receiving end (not shown) of the airless paint spraying system (not shown). The adapter 51 permits a connecting element 57, such as, but not by way of limitation, a washer or an O-ring, or any other component known in the art which operates as described herein to be utilized to create a tight connection and seal between the filter 10 and the airless paint spraying system. Such a connecting element may comprise rubber, plastic, metal, nylon, or any combination thereof. The adapter 51 may be formed integrally with the top 40, or may form a separate component or components, as those having ordinary skill in the art will appreciate.

Turning now to FIGS. 9–12, the various filters shown therein are not a part of the present invention, but are shown only to illustrate the multiple in-line filtering which heretofore has been required in the art. The rock catcher 58 (FIG. 9) is formed of a loose, heavy wire mesh, as schematically shown. Such a mesh is designed primarily to eliminate larger debris from the paint, before it enters the airless paint sprayer. The fine mesh nylon net, not shown, is sized to fit over the rock catcher 58, and has a draw string at the top, so it may be secured about the rock catcher 58. The fine mesh nylon net has been utilized to remove the smaller debris from the paint before it entered the sprayer. When paint is moved through the combined rock catcher 58 and nylon net at a pressure of about 2,000 psi to about 5,000 psi, particles of debris are forced through the fine nylon net and, unless very large, are not impeded by the rock catcher 58.

As described earlier, the larger cylindrical filter 60 (FIG. 10) is contained within the sprayer, and is formed of a fine wire mesh (approximately 100 mesh). The larger cylindrical filter 60 is not re-cleanable. Further, it will be appreciated that the larger cylindrical filter 60 has a layer of fine wire mesh in only a cylindrical shape. When paint is moved through the larger cylindrical filter 60 at a pressure of about 2,000 psi to about 5,000 psi, particles of debris are forced through the fine wire mesh.

The smaller cylindrical filter 62 (FIG. 11), which is contained within the handle of the spray gun, is formed in a manner similar to that just described above for the larger cylindrical filter. This filter is not re-cleanable, or re-usable. In the same manner, the pressure of the paint flow also forces particles of debris through the smaller cylindrical filter 62.

The fine nylon mesh disk filter 64 (FIG. 12) is placed in-line in the spray gun just before the spray tip (from which the paint emerges). Any impurities or debris that have escaped the earlier filters, as described above, easily passes through the fine, narrow nylon mesh which is placed across a disk to form said filter 64. The impurities or debris may emerge from the spray tip, or may cause the spray tip to become clogged, thereby stopping the flow of paint. The above-described pressure forces such debris through the nylon mesh disk filter 64. It will be appreciated that while this nylon mesh disk filter 64 may be re-cleanable, it is more cost effective to re-place the part, and often nylon mesh disk filter has unwanted openings formed therein, as do the other filters shown in FIGS. 9–11 and described above after unwanted debris passes through, thereby rendering such a filter useless. Therefore, after debris is forced through any filter shown in FIGS. 9–12 and described herein, such filter is useless and must be replaced. It will be appreciated that the rock catcher 58, the nylon bag (not shown), the large cylindrical filter, the small cylindrical filter, and the nylon mesh disk filter are all known in the art and readily commercially available.

Figure 13:
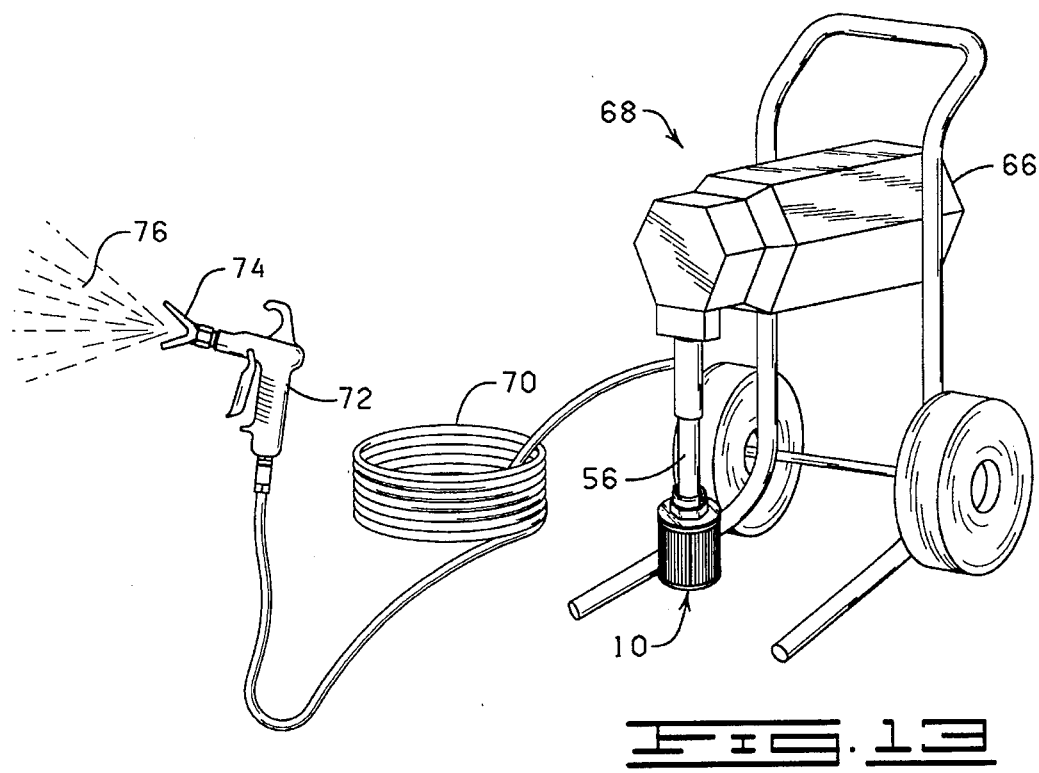
FIG. 13 is a perspective view of the filter of FIG. 1, but showing the filter connected to an airless paint sprayer.
Figure 14:
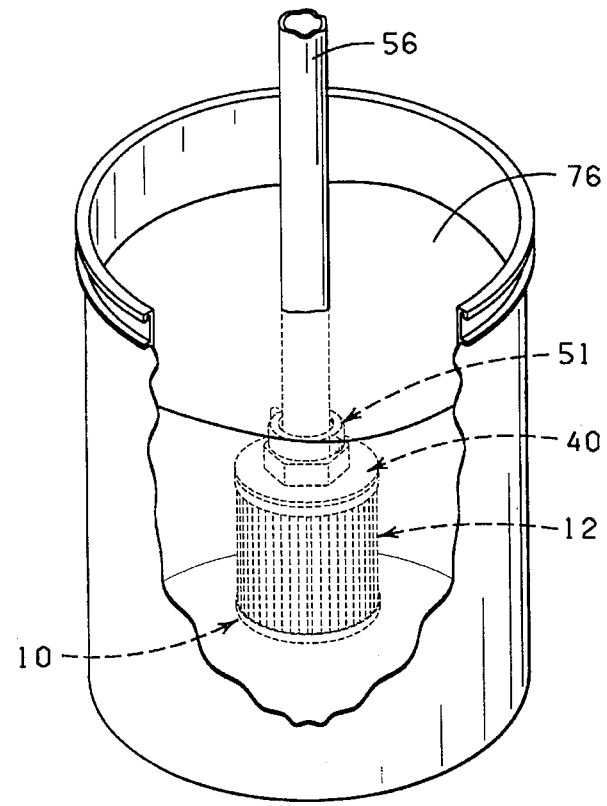
FIG. 14 is a perspective cut-away view of the filter of FIGS. 1 and 8, but showing the filter connected to an airless paint sprayer with the filter disposed in a container filled with paint.

Referring now to FIGS. 13–14, the filter 10 as is shown in FIG. 13 is connected via the adapter 51 to the receiving end 56 of an airless paint sprayer 66. The filter 10 is ready to be disposed in a container filled with paint. FIG. 14 shows the filter 10 in a container filled with paint, showing the filtering process.

In a general method of use, a thoroughly clean base 12 of the filter 10 is connected to a thoroughly clean top 40 having an adapter 51 connected thereto. The second end 54 of the adapter 51 is connected to the receiving end 56 of an airless paint sprayer 66. The airless paint sprayer 66 is a part of an airless paint spraying system 68, which includes the filter 10, the airless paint sprayer 66, the hose 70 connected at the outlet of the airless paint sprayer, the spray gun 72 connected to the opposite end of the hose 70, and the spray tip 74 connected to the outlet of the spray gun 72, from which the filtered paint 76 emerges in spray form to cover or coat a surface/object in said paint 76, as illustrated in FIG. 13.

The receiving end 56 of the airless paint sprayer 66 with the filter 10 connected thereto is disposed into a container containing paint 76. The pump (not shown) on the airless paint sprayer 66 is started, therefore causing the paint 76 to be moved against and through the filter 10 into the receiving end 56 of the airless paint sprayer 66, the paint 76 moving through the airless paint sprayer 66 and through the other components of the airless paint spraying system 68, (namely, the hose, 70, the spray gun 72 and the spray tip 76) the paint 76 emerging from the spray tip 74 to coat the selected surface/object. Strips of debris (not shown) in the paint 76 are suctioned against the outer portions of the accordion wire mesh 26, as described above. Particles and small pieces of debris (not shown) are pulled into the inner portions of the accordion wire mesh 26, as also described above. The great plurality of folds in the accordion wire mesh 26 has sufficient surface area to prevent or greatly reduce the stoppage of the flow of paint 76 therethrough, the support frame 36 acting to hold the accordion wire mesh 26 in place against the pressure of the movement of the paint 76 through the filter 10. The accordion folds and the greater surface area provided thereby cause less pressure on the filter 10, permitting the filter 10 to effectively filter all debris from the paint 76.

It will be appreciated, by those having ordinary skill in the art, that the flat surface area provided by the other filters illustrated in FIGS. 7–10 and described herein cause debris to be moved to and through these filters by the pressure exerted by the pump. When debris moves through a filter, it effectively ruins that filter, thereby causing clogs in the airless paint spraying system which result in stoppage of the paint 76 flow therethrough. The greater surface area provided by the present filter permits less pressure on any one discrete area, thereby preventing unwanted debris from being pulled through the filter, i.e., the wire mesh, and causing clogs and paint 76 stoppages. Further, the accordion-like surface of the present filter permits the paint 76 to continue to be filtered even when large clumps are caught in the outer surface of the filter, due to the sinusoidal "accordion" pattern of the accordion wire mesh 26. Again, the large surface area traps the large debris, but provides sufficient surface area to continue filtering the paint 76.

EXAMPLE

The present filter 10 was connected to an airless paint spraying system 68, as shown in FIGS. 131 and 14 and described in detail above. The filter 10 was emersed into a five gallon container of paint, one gallon of the paint having been removed, and replaced by one gallon of dirt, pebbles, stone, leaves, twigs, and other organic debris.

The pump of the airless paint spraying system was turned on, and the remaining paint in the paint container was utilized to paint a selected surface. All paint was utilized to spray paint the surface. No clogs or paint stoppages occurred, and an even, smooth coating of paint was disposed on the selected surface even though the filter 10 was the only filter used with the airless paint spraying system 68.

Changes may be made in the embodiments of the invention described herein, or in parts or elements of the embodiments described herein, or in the sequence of steps of the methods described herein, without departing from the spirit and/or scope of the invention as defined in the following claims.

What is claimed is:

1. A filter for use in filtering paint in an airless paint spraying system comprising:
    a base, comprising
        an upper end, a lower end, and an outer peripheral surface, an opening in the upper end forming an inner peripheral surface,
    wherein a substantial portion of the outer peripheral surface comprises an accordion wire mesh and means to hold the accordion wire mesh to the base,
    wherein the inner peripheral surface comprises a support frame having means to permit a flow of paint therethrough, said means comprising a solid sheet of metal comprising a plurality of apertures, and
    wherein the lower end has an outer surface which comprises an accordion wire mesh and means to hold the accordion wire mesh to the lower end; and
    a top, comprising
        an upper surface, a lower surface and an outer periphery, wherein the top has means for disconnecting and reconnecting the top to the base,
    wherein the top further comprises both a first connection means for connecting the top to the base, and a second connection means for connecting the filter to the airless paint spraying system,
    wherein said disconnecting means of the top permits cleaning of both the inner peripheral surface and the outer peripheral surface of the base such that the filter is re-usable after said cleaning, and
    wherein said filter is connected via the second connection means to the airless spraying system and then inserted in a paint container.

2. The filter of claim 1 wherein the base further comprises an upper collar and a lower collar.

3. The filter of claim 1 wherein the lower end of the base further comprises a plurality of extensions.

* * * * *

UNITED STATES PATENT AND TRADEMARK OFFICE
CERTIFICATE OF CORRECTION

PATENT NO. : 5,567,323

DATED : October 22, 1996

INVENTOR(S) : William E. Harrison, Jr.

It is certified that error appears in the above-identified patent and that said Letters Patent is hereby corrected as shown below:

Column 2, line 2, after 'able', please delete "10".

Column 5, line 4, please delete "14", and substitute therefor --16--.

Column 6, line 40, after 'has a', please delete "the".

Column 7, line 33, after 'tip', please delete "76", and substitute therefor --74--.

Signed and Sealed this

Fourth Day of February, 1997

Attest:

BRUCE LEHMAN

Attesting Officer     Commissioner of Patents and Trademarks